United States Patent
Habeeb et al.

(10) Patent No.: US 6,681,857 B2
(45) Date of Patent: Jan. 27, 2004

(54) METHOD OF GENERATING HEAT AND VIBRATION IN A SUBTERRANEAN HYDROCARBON-BEARING FORMATION

(75) Inventors: Jacob J. Habeeb, Westfield, NJ (US); James P. Stokes, Houston, TX (US); Martin L. Gorbaty, Westfield, NJ (US)

(73) Assignee: ExxonMobil Upstream Research Company, Houston, TX (US)

( * ) Notice: Subject to any disclaimer, the term of this patent is extended or adjusted under 35 U.S.C. 154(b) by 31 days.

(21) Appl. No.: 10/050,637

(22) Filed: Jan. 15, 2002

(65) Prior Publication Data

US 2002/0139531 A1 Oct. 3, 2002

Related U.S. Application Data

(60) Provisional application No. 60/263,366, filed on Jan. 23, 2001.

(51) Int. Cl.$^7$ .............................................. E21B 28/00
(52) U.S. Cl. ...................... 166/299; 166/300; 166/308.2
(58) Field of Search .................................. 166/400, 299, 166/300, 308; 507/243, 244

(56) References Cited

U.S. PATENT DOCUMENTS

| | | | |
|---|---|---|---|
| 2,011,578 A | 8/1935 | Hale | 102/313 |
| 2,316,596 A | 4/1943 | Kennedy | 102/23 |
| 2,430,874 A | 11/1947 | Hale | 548/326.1 |
| 2,436,311 A | 2/1948 | Larson et al. | 548/326.1 |
| 2,497,308 A | 2/1950 | Larson | 548/326.1 |
| 2,497,309 A | 2/1950 | Larson et al. | 548/326.1 |
| 2,517,750 A | 8/1950 | Wilson | |
| 2,613,210 A | 10/1952 | Hurwitz et al. | 548/313.7 |
| 2,708,876 A | 5/1955 | Nowak | |
| 2,812,333 A | 11/1957 | Steele | 548/323.5 |
| 2,825,732 A | 3/1958 | Wayland | 260/309.7 |
| 2,892,843 A | 6/1959 | Levine | 260/309.7 |
| 3,004,002 A | 10/1961 | Kaplan | 260/67.5 |
| 3,042,658 A | 7/1962 | Libby | 260/77.5 |
| 3,075,463 A | 1/1963 | Eilers et al. | 102/21 |
| 3,251,852 A * | 5/1966 | De Groote et al. | 252/392 |
| 3,266,572 A | 8/1966 | Woodward | 166/38 |
| 3,312,619 A | 4/1967 | Vineyard | 252/47.5 |
| 3,314,477 A | 4/1967 | Boevers et al. | 166/38 |
| 3,336,982 A | 8/1967 | Woodward et al. | 166/38 |
| 3,494,895 A | 2/1970 | Strickrodt et al. | 260/77.5 |
| 3,565,173 A | 2/1971 | Anderson | 166/252 |
| 3,593,793 A | 7/1971 | Kelseaux | 166/280 |
| 3,597,443 A | 8/1971 | Crowther | 260/309.7 |
| 3,610,338 A | 10/1971 | Harnsberger et al. | 166/272 |
| 3,757,861 A | 9/1973 | Routson | 166/273 |
| 4,405,794 A | 9/1983 | Harden | 548/229 |
| 4,577,031 A | 3/1986 | Iovine et al. | 548/319 |
| 4,642,351 A | 2/1987 | Woo et al. | 548/317 |
| 4,793,416 A | 12/1988 | Mitchell | 166/266 |
| 4,846,274 A | 7/1989 | Clough | 166/270 |
| 4,864,026 A | 9/1989 | Bickert et al. | 544/315 |
| 4,867,238 A | 9/1989 | Bayless et al. | 166/261 |
| 4,897,480 A | 1/1990 | Schoenleben | 544/315 |
| 4,956,028 A | 9/1990 | Forsberg et al. | 149/2 |
| 5,112,984 A | 5/1992 | Richey et al. | 548/320 |
| 5,146,986 A | 9/1992 | Dalrymple | 166/294 |
| 5,371,183 A * | 12/1994 | McGhee et al. | 528/422 |
| 5,407,500 A | 4/1995 | Forsberg et al. | 149/2 |
| 6,354,381 B1 | 3/2002 | Habeeb et al. | 166/400 |
| 6,439,309 B1 * | 8/2002 | Matherly et al. | 166/276 |

* cited by examiner

Primary Examiner—David Bagnell
Assistant Examiner—Matthew J Smith

(57) ABSTRACT

A method for recovering oil in a reservoir by generating chemical microexplosions in the reservoir. The invention treats the hydrocarbon-bearing reservoir by decomposing in situ at least one PEH-3CO, thereby generating heat, shock, and $CO_2$. A preferred method comprises the steps of depositing PEH-3CO into the formation and depositing an acid into the formation to cause the PEH-3CO to decompose and generate heat and gas.

13 Claims, 2 Drawing Sheets

METHOD OF GENERATING HEAT AND VIBRATION IN A SUBTERRANEAN HYDROCARBON-BEARING FORMATION

CROSS-REFERENCE TO RELATED APPLICATIONS

This application claims priority benefit to U.S. provisional application No. 60/263,366 filed Jan. 23, 2001.

FIELD OF THE INVENTION

The present invention relates to the recovery of hydrocarbons from petroleum reservoirs, and it relates particularly to the use of chemical microexplosions to recover hydrocarbons from these reservoirs.

BACKGROUND OF THE INVENTION

During primary depletion, wells flow by natural drive mechanisms such as solution gas, gas cap expansion and water flux. In the secondary recovery phase water or gas injection is usually used to maintain reservoir pressure and to sweep out more hydrocarbons. However, a significant amount of hydrocarbons remain unrecovered due to capillary forces and reservoir inhomogeneities. This hydrocarbon fraction is not swept by gas and/or water flooding.

It is known to use physical vibrations produced by surface or downhole sources to mobilize trapped oil. This technology is based on claims and observations, that earthquakes, mechanical and acoustic vibrations increase oil production. Practical and effective demonstration of the technology is yet to be established.

It is also known to use heat to cause viscous oil to flow. U.S. Pat. No. 4,867,238, Bayless, disclosed injecting hydrogen peroxide into a hydrocarbon reservoir and using the heat from its decomposition and combustion of hydrocarbon to cause viscous oil to flow in the reservoir. U.S. Pat. Nos. 3,075,463 by Eilers; 3,314,477 by Boevers; and 3,336,982 by Woodward disclosed injecting two or more chemicals that react in situ to generate heat to stimulate oil recovery. The chemicals used in the prior art processes tended to react rapidly to produce large explosions and shock waves that fractured formation rock. In many of the prior art processes, the fracturing to produce large oil paths was the ultimate goal. An improved, less violent process is needed for generating heat, pressure, and vibration in situ to stimulate hydrocarbon production from the formation.

SUMMARY

The present invention discloses a new and improved method of generating in a hydrocarbon-bearing formation heat, pressure, and a rapid physical vibration (a microexplosion that generates a microshock). Microexplosions are defined as the process by which chemicals rapidly react to generate microexplosions and micro-pressure waves in addition to heat and pressure to coalesce and drive hydrocarbons out of a hydrocarbon-bearing formation such as an oil reservoir. A preferred process of this invention reacts in situ a polyamine-3CO complex, preferably pentaethylene hexamine-3 CO, with an acid to produce heat, vibration, and $CO_2$.

There are several advantages to this invention: (1) the microexplosion can be controlled to trigger in a specific time and place, (2) the magnitude of the explosion can be controlled by concentration variation and molecular design, and (3) the ethylene hexamine serves as a dispersant to mobilize oil. The method stimulates hydrocarbon recovery by generating physical microshock and vibration, by generating pressure and heat which improve hydrocarbon mobility and gaseous by-products of the in situ reactions improve hydrocarbon mobility.

DETAILED DESCRIPTION OF THE INVENTION

Figure 1:
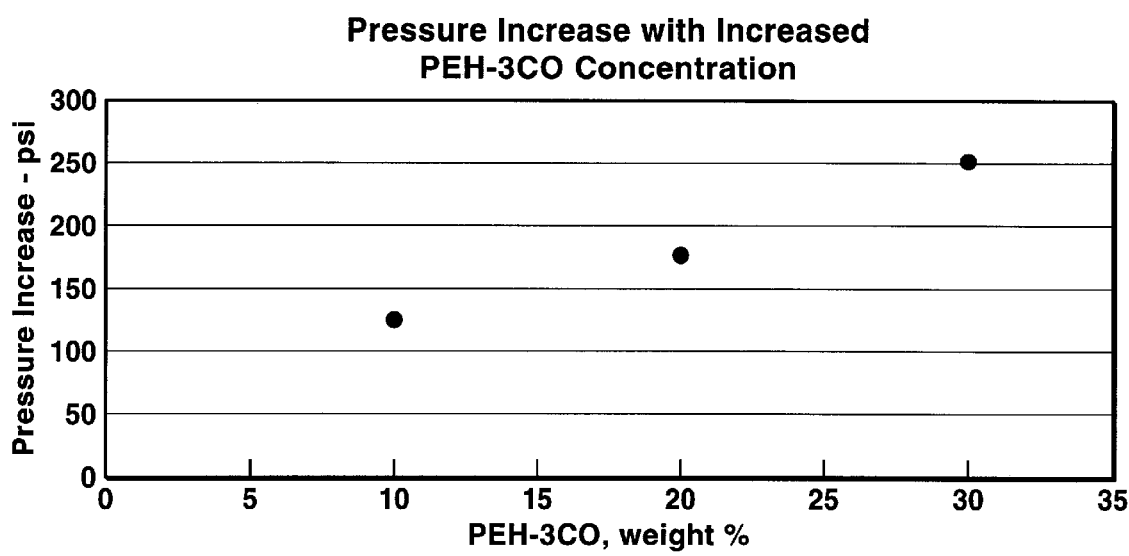
FIG. 1 shows the pressure increase for the reaction of $H_2SO_4$ with varying concentrations of PEH-3CO in brine in laboratory tests.

The method of the present invention treats a hydrocarbon-bearing formation by decomposing in situ a polyamine-3CO complex, preferably pentaethylene hexamine-3CO, thereby generating heat, shock, and gas, preferably $CO_2$. The pentaethylene hexamine -3CO complex is represented herein as "PEH-3CO". PEH-3CO can be in monomeric or polymeric form and it can be injected into the formation through one or more injection wells or generated in situ by injecting two or more chemical compounds that react in situ to form the desired PEH-3CO, or a combination of both. The method of this invention will be described with respect to treatment of an oil reservoir.

In one embodiment of the present invention, PEH-3CO is injected into a hydrocarbon-bearing reservoir. An acid is then injected into the reservoir to cause generation of heat, gas, and microshock. PEH-3CO is injected down a wellbore followed by a spacer liquid unreactive with the PEH-3CO, and this in turn is followed by an oxidizing agent that is substantially unreactive with the spacer liquid and forms a chemical reaction when brought into contact with the PEH-3CO at the temperature and pressure existing in the formation. The PEH-3CO and oxidizing agent are displaced into the formation and forced a distance from the wellbore, whereby the PEH-3CO and oxidizing agent are intermixed in the formation to produce a microexplosion.

Either the PEH-3CO or the oxidizing agent may be injected down the wellbore first, followed by the spacer fluid, and this in turn by the other component of the reaction mixture. Thereafter, the spacer liquid is injected down the wellbore in sufficient quantity to displace the first component of the reaction mixture, the spacer liquid, and the second component of the reaction mixture into the formation.

The spacer can be any liquid that is substantially unreactive with either the PEH-3CO or oxidizing agent used. Nonlimiting examples of suitable spacers may include water, brine, carbon tetrachloride, and the like. It is preferred, although not necessary, that the spacer have a viscosity greater than either the PEH-3CO or oxidizing agent.

In another embodiment, $CO_2$ and pentaethylene hexamine (PEH) are injected into the formation and reacted in situ to form PEH-3CO, either in monomeric or polymeric form. The reactants are introduced into the formation through one or more wellbores that penetrate the formation. The two reactants are introduced into the wellbore separately. As the injection proceeds, the injected reactants get mixed (co-mingled) in the formation. As the mixing occurs, chemical reaction occurs in the formation to produce PEH-3CO. A second reactant, an oxidizing agent, causes a chemical reaction when brought into contact with the PEH-3CO at the temperature and pressure existing in the formation.

The PEH-3CO may be represented by the general formula:

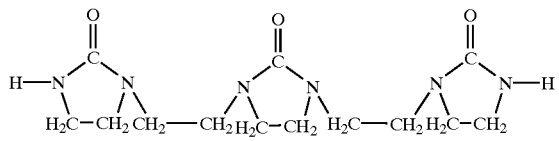

In polymeric form, the polyamines used in the present invention can be characterized by the general formula:

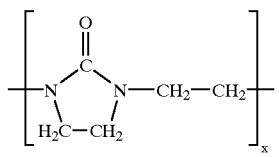

wherein "x" is an integral number, but may have non-integral average values, since the polymer may consist of a number of individual polymer chains of longer or shorter chain length. The value of x will typically have values greater than about 3 and up to about 100.

The stoichiometry of the PEH-3CO/acid system is as follows:

PEH-3CO+nHX (acid)→PEH $H^{n+}$+$X^{n-}$+3$CO_2$+heat

This reaction does not produce oxygen but regenerates $CO_2$. The production of $CO_2$ is a desirable feature of the invention because the $CO_2$ can promote mobilization of the hydrocarbons resident in the formation without causing combustion of the hydrocarbon or explosion.

An important requirement of success is the ability to deliver the explosives to the hydrocarbon bearing regions of the reservoir. The chemical reactants can be delivered either in solutions, as small diameter emulsions, or as small diameter solid slurries. This requires a determination of the "minimum explosive reactant volume" that will yield a "microexplosion". Below this minimum volume, the heat of the reaction and the molar volume of explosive products can be dissipated to the surroundings without causing rapid heat, pressure or mechanical shocks. The amount of reactants needed to produce microexplosions in accordance with the process of this invention can be determined by those skilled in the art based on the teachings of this patent.

The PEH-3CO used in the present invention can be manufactured by those skilled in the art using known synthesis processes by bubbling $CO_2$ into a PEH solution at room temperature.

The method of the present invention involves controlled chemical microexplosions to generate energy (heat, pressure, and vibration) to change the properties and structure of reservoirs. For example, the controlled chemical microexplosion can help overcome the capillary forces that hold hydrocarbon droplets trapped at the pore level. These local microexplosions can promote mobilization and coalescence of the trapped hydrocarbon. Heat and gases generated from such explosions can also enhance hydrocarbon flow. The gases produced by the reaction of the PEH-3CO will tend to increase the pressure rapidly within the formation. The increase in pressure can assist in moving the oil contained within the formation toward a production well. Additionally, the reaction produces heat which can reduce the viscosity of the oil and help mobilize it so that it can be moved toward a production well. The local microexplosions can also change the physical and chemical structure of the reservoir and thus modify the flow behavior of water and hydrocarbons in the reservoir.

In this invention, the chemicals may be delivered to the reservoir by injection with fluids such as water, gases, water-based emulsions or stabilized foams. Local microexplosions can then be triggered to generate vibration which can mobilize oil ganglia trapped at the pore level. The trigger mechanism depends on the chemistry used. Explosion triggers could include higher temperature, increased pressure, frictional effects or mixing of reagents to produce chemical reactions. The explosions can also be triggered by synergistic reaction of two or more components delivered at different time intervals or encapsulated in micron size pellets "emulsified" in the injection fluid. The size, intensity and duration of the explosion can be controlled by the type and structure of the chemicals used. In this novel method, the exothermic chemical reactions which result in controlled local explosions can also generate: (a) heat that helps lower oil viscosity, (b) gases that help create internal pressure, and (c) chemicals that may react with the reservoir rock. These factors, in addition to physical vibration, may significantly enhance hydrocarbon mobility in the reservoir. As described herein, a reservoir is defined as a geological structure containing hydrocarbons in the form of oil, gas, coal and minerals.

The following examples illustrate the practice of this invention on a laboratory scale.

EXAMPLE 1

The gas and pressure generation due to the reaction of PEH-3CO and sulfuric acid was tested in a confined cell. The test was carried out by first dissolving reactants in water or brine and then placing the mixture in a confined cell. The confined cell, which served as a reaction vessel was a T-shape cell (volume=4–16 cc) constructed with stainless steel (#304) fittings. It was composed of a "street" fitting in the middle with a T-shape connected to two compression fittings (containing rupture disks) which served as compartments to hold the liquid reactants. A thermocouple was placed inside one arm (compression compartment) of the T cell and a pressure transducer was connected to the second arm of the cell. Both arms were connected to Kipp and Zoner high-speed recorder model #BD112 to monitor temperature and pressure changes during the reaction. In a typical experiment, 1 ml of compound A (PEH-3 CO) was placed in one arm of the T cell and compound B, 1 ml (sulfuric acid), in the second arm. Upon remote tilting of the cell manually, the two compounds mixed and reacted. The rapid changes in temperature and pressure were monitored and recorded during the testing. The test results are shown in FIG. 1.

FIG. 1 shows the pressure increase for the reaction of $H_2SO_4$ of varying concentration of PEH-3CO in brine. The data show that the pressure increased as the concentration of PEH-3CO increased.

EXAMPLE 2

Figure 2:
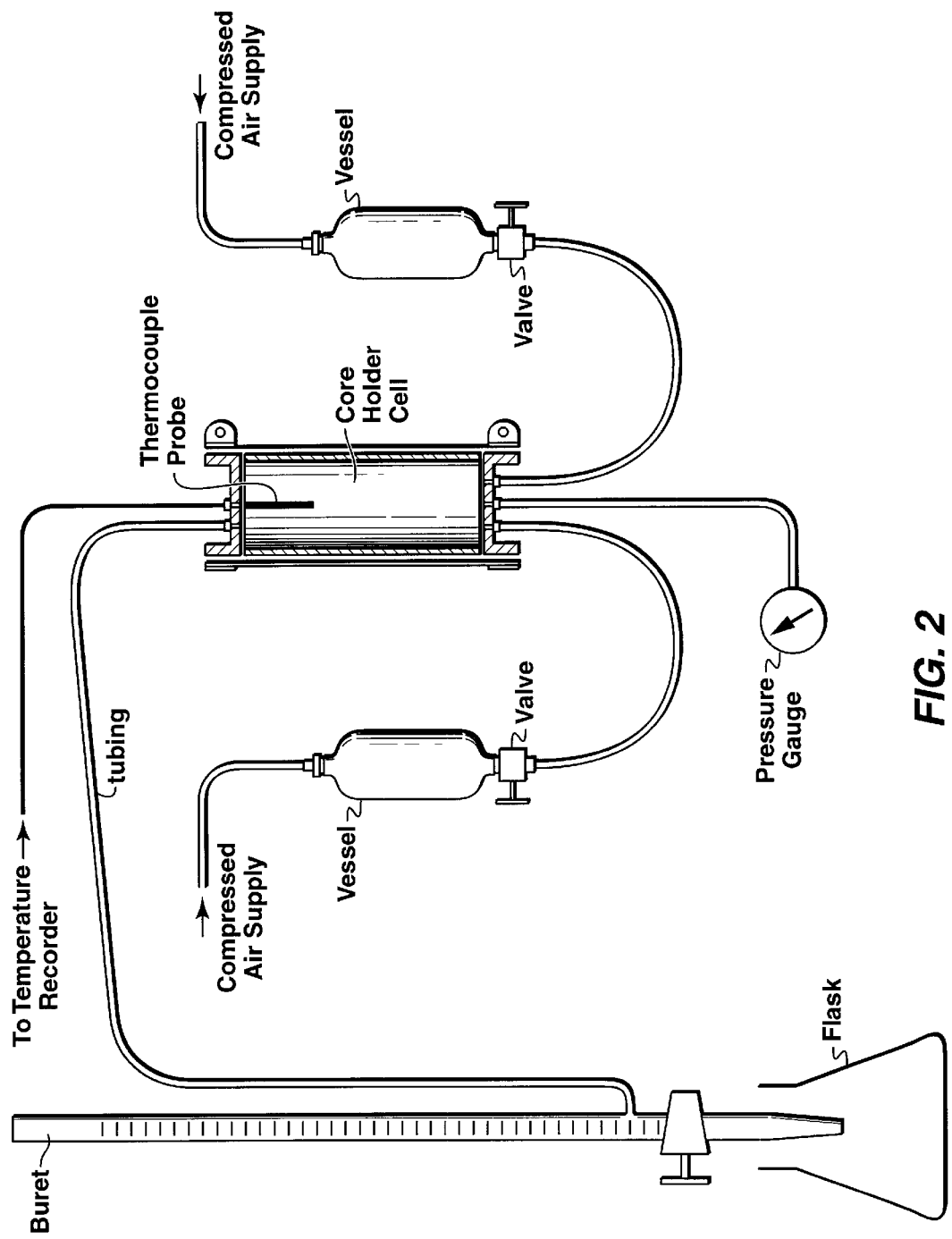
FIG. 2 shows a schematic of the test assembly to measure oil mobilization due to energetic reactions using the process of the present invention.

Oil mobilization was tested in a flow cell for PEH-3CO and sulfuric acid system. Hydrocarbon mobilization was carried out in a specially designed flow cell. The test set-up assembly is shown in FIG. 2. It consisted of a core holder cell 10 having from the bottom of the cell 10 three outlets 11, 12, and 13 connected to two 50 ml stainless steel vessels 20 and 21 and a pressure gage 22 and from the top of cell 10 two outlets connected to Teflon tubing 14 to buret 30 and a thermocouple 31 connected to a temperature recorder (not shown). The two vessels 20 and 21 were connected to compressed air supplies (not shown). Each vessel 20 and 21 was connected to the core holder cell 10 through a valves 23 and 24. The buret 30 was used to measure the amount of recovered oil. A Berea sandstone (1.5 inch diameter and 10.0 inch length, which is not shown) was sealed in the cell 10 with super strength glues (approximately 1 mm thickness). The rock was tightly fitted with a rubber hose (an auto exhaust pipe) and a reinforced aluminum skirt (not shown). Both ends of the rock were fitted with aluminum plates (1.5 inch diameter). A Teflon disk was inserted between the rock and the bottom aluminum plate to minimize the amount of liquid in the area before interring the rock.

The following flow sweeps of liquids were made: 100 cc of water was first pumped into the cell from one vessel as the water saturation step followed by 42.0 cc of crude oil from the other vessel. Another 100 cc of water was pumped after the oil to push the mobile oil out of the rock. The immobile oil remained in the porous space of the rock. A 8 cc of 25% PEH-3CO solution was then pumped into the system followed by 3 cc of water as spacer and 8 cc of 2M $H_2SO_4$ solution. At that time a reaction occurred that generated gas and heat which resulted in mobilization of the remaining oil. The same two vessels were used to pump all solutions into the core holder cell.

The fluid flow steps through the cell included the following quantities:

(a) 100 cc of water (saturation step)
(b) 42 cc of crude oil
(c) 100 cc of water to flush mobile oil
(d) 8 cc of 25% PEH-3CO (pore volume=8 cc)
(e) 3 cc of water (spacer)
(f) 8 cc of 2M $H_2SO_4$ (pore volume=8 cc)

The results of the test are as follows:

| | |
|---|---|
| Initial crude oil injected = | 42 cc |
| Oil recovered due to water flooding = | 4.9 cc |
| Residual oil = | 42 − 4.9 = 37.1 cc |
| Oil recovered due to acid reaction = | 32.8 cc |
| % oil recovered = | $32.8/37.1 \times 100 = 88.4\%$ |

The temperature increased from 25° C. to greater than 70° C. in 30 seconds.

EXAMPLE 3

This examples used the same flow steps that were used in Example 2 except the following quantities were used:

(a) 100 cc of water
(b) 42 cc of crude oil
(c) 100 cc of water to flush mobile oil
(d) 4 cc of 25% PEH-3CO
(e) 3 cc of water (spacer)
(f) 8 cc of 2M $H_2SO_4$ The results of the test are as follows:

| | |
|---|---|
| Initial crude oil injected = | 42.0 cc |
| Oil recovered due to water flooding = | 4.5 cc |
| Residual oil = | 37.5 cc |
| Oil recovered due to acid reaction = | 32.6 cc |
| % oil recovered = | $32.6/37.5 \times 100 = 86.9\%$ |

A person skilled in the art, particularly one having the benefit of the teachings of this patent, will recognize many modifications and variations to the specific process disclosed above. The specifically disclosed embodiments and examples should not be used to limit or restrict the scope of the invention, which is to be determined by the claims below and their equivalents.

What is claimed is:

1. A method of treating a hydrocarbon-bearing formation comprising decomposing in situ PEH-3CO, thereby generating heat, shock, and $CO_2$.

2. The method of claim 1 wherein at least one PEH-3CO is of the general formula:

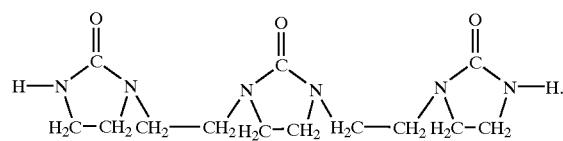

3. The method of claim 2 wherein the PEH-3CO is polymeric.

4. The method of claim 1 further comprises decomposing the PEH-3CO by reacting the PEH-3CO with an oxidizing agent.

5. The method of claim 4 wherein the oxidizing agent is an acid.

6. The method of claim 5 wherein the acid is selected from the group consisting of sulfuric acid, nitric acid, hydrochloric, and acetic acid.

7. The method of claim 1 wherein the method comprises, before the in situ decomposition of the PEH-3CO, the additional steps of:

(a) injecting the PEH-3CO into the formation through a wellbore positioned therein;
(b) injecting an inert spacing medium into the formation through the wellbore; and
(c) injecting an oxidizing agent into the formation through the wellbore, said PEH-3CO and oxidizing agent being capable of reacting to produce microexplosions in situ.

8. The method of claim 7 wherein, prior to step (a) making the PEH-3CO by reacting $CO_2$ with PEH solution.

9. The method of claim 1 further comprises, before the decomposition of the PEH-3CO, injecting into the formation components of the PEH-3CO and reacting the components in situ to produce the PEH-3CO.

10. The method of claim 9 wherein the components of the PEH-3CO injected into the formation comprise PEH solution and $CO_2$ gas.

11. The method of claim 10 wherein the components react in situ to produce PEH-3CO.

12. The method of claim 1 wherein said reaction changes the physical structure of said formation, thereby changing the flow pattern of liquids and gases contained therein.

13. The method of claim 1 wherein said decomposition in said formation enhances recovery of hydrocarbons contained therein.

* * * * *